No. 878,504.  
PATENTED FEB. 11, 1908.  
W. A. COATES.  
MANUFACTURE OF NOSE PIECES FOR SPECTACLES AND EYEGLASSES.  
APPLICATION FILED MAR. 9, 1906.
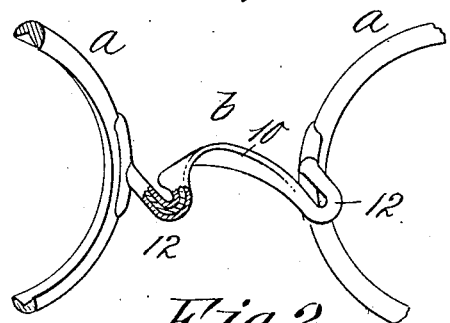
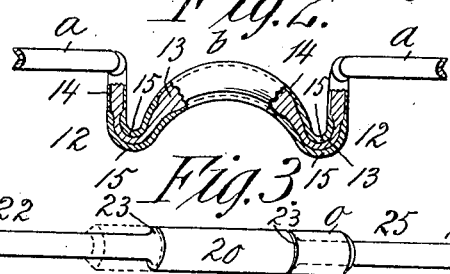
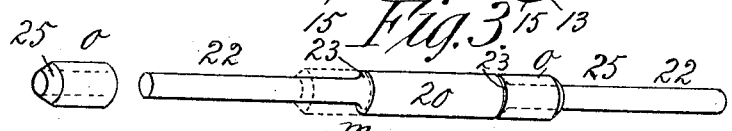
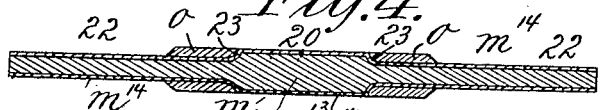
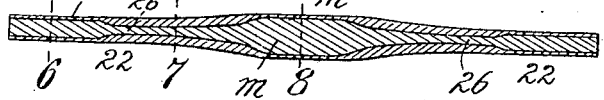
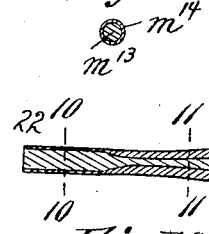
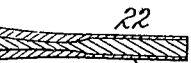
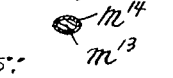
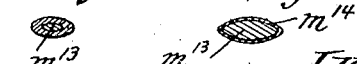
Witnesses:  
John A. Garfield  
G. R. Driscoll  
Inventor,  
Walter A. Coates.  
by W. S. Bellm  
Attorney.

UNITED STATES PATENT OFFICE.

WALTER A. COATES, OF PROVIDENCE, RHODE ISLAND.

MANUFACTURE OF NOSE-PIECES FOR SPECTACLES AND EYEGLASSES.

No. 878,504.

Specification of Letters Patent.

Patented Feb. 11, 1908.

Application filed March 9, 1906. Serial No. 305,170.

*To all whom it may concern:*

Be it known that I, WALTER A. COATES, a citizen of the United States of America, and resident of Providence, in the county of Providence and State of Rhode Island, have invented certain new and useful Improvements in Manufacture of Nose-Pieces for Spectacles and Eyeglasses, of which the following is a full, clear, and exact description.

In gold filled spectacle and eye glass frames the wire used for the construction of the frame is of base metal having a rolled gold covering of a thickness commonly only approximately one tenth of the diameter of the wire, and after comparatively short usage of the eye glass the thin gold coverings at the return bent portions at the opposite extremities of the nose piece or bridge become worn away, exposing the base metal, or are penetrated by perspiration, and acids thereof, causing corrosion which is observable not only at the return bent portions of the nose piece which are worn or penetrated as stated, but even at portions of the frame remote therefrom, thus rendering the eye glass undesirable for use, and making it incumbent in many cases for the seller or the manufacturer, dealing under a guarantee, to replace, with loss, the defective eye glass.

This invention relates to the manufacture of spectacle and eye glass frames which comprise the nose piece or bridge having return bent extremities adjacent and connected with the lens frames, all made from filled gold wire whereby the nose piece has gold coverings of increased thickness at and adjacent the aforesaid return bent portions and so that the eye glass may be constantly used for many years, retaining for all such time the appearance of one having a solid gold frame.

The invention consists in the method for the production, in an entirely practicable manner, of a nose piece such as above described.

The construction of the nose piece and the method of its production are disclosed in the accompanying drawings, and the following description; and in said drawings,—Figure 1 is a perspective view of portions of two lens frames and the uniting nose piece. Fig. 2 is a partial edge view of the same, the return bent portions of the nose piece having the thicker gold coverings being in section. Fig. 3 is a perspective view of the filled gold wire or blank and the pure gold sections or ferrules from which one of the improved nose pieces is to be produced,—one of the ferrules being shown as removed from the position in which it is united to the wire. Fig. 4 is a central longitudinal section of the same parts. Fig. 5 is a central longitudinal section of the same parts united and swaged to tapered form,—Figs. 6, 7, and 8 being cross sections respectively on the lines 6—6, 7—7, and 8—8, Fig. 5. Figs. 9, 10, 11 and 12 are views corresponding to Figs. 5 to 8, but showing further modification in the cross sectional form of the swaged piece appropriate for the making of the nose bridge.

In the drawings,—$a\ a$ represent portions of the lens frames of a spectacle or eye glass, said frames being united by the nose piece $b$ having a bowed intermediate portion 10 and return bent extremities 12, 12, at the opposite ends of the bowed part 10, the whole being composed of a flattened wire having a base metal core 13 and a generally thin core covering and inclosing layer 14, which layer at the return bend, and as represented at 15, is very much thicker than at other portions along the length of the nose piece.

In the production of this improved nose piece, I first provide a wire blank $m$ consisting of a body or core $m^{13}$ of base metal, and a very thin covering layer $m^{14}$ of gold,—said blank round in cross section having a comparatively thick middle portion 20 and reduced extremities 22, 22; and the shoulders 23 at the junctions of the parts 22, 22, with the intermediate part 20 are beveled. I next fit and unite two pure gold ferrules or bands $o\ o$ on the portions 22, 22, of the blank $m$ in endwise contact against the shoulders 23, using gold solder in this operation. The gold ferrules sleeves or bands $o$ are of an external diameter about equal to that of the thicker middle portion 20 of the wire blank $m$, and the end of each ferrule, to match with the beveled shoulder 23, is made with a flaring mouth while its opposite end is externally beveled, as represented at 25. These parts $m$ and $o\ o$ being solidly united, the composite blank is swaged by the use of suitable swaging rolls or dies whereby to assume the structural character represented in Figs. 5 to 8, in which it is seen that the middle portion 20 of the blank remains in its original form as do, also, its very end portions, but the ferrules $o\ o$ are elongated and while to some extent they are tapered towards their outer ends, they serve more particularly in the swaging action to increase the attenuation, as represented at 26, 26, Fig. 5, of the parts of the base-metal core within the blank extremities 22, 22, between the thick middle portion and their very ends,—this attenuation of the core resulting, in the swaging action, because it is of softer quality than that of the gold ferrules in pressure thereagainst. In this swaging process the gold of which the ferrules are composed merges without perceptible joint, seam or other indication of juncture to form a continuous surface, and as one with the gold covering $m^{14}$ of the blank $m$ both at its middle portion 20 and near its opposite ends. The blank thus formed might now be made up into a nose piece of the approximately W-shape, round in cross section throughout all points of its length, but as such is not generally the desired or accepted shape of the nose piece, I, furthermore, after bringing the blank to the form shown in Figs. 5 to 8 and by swaging, using suitable dies or swaging rolls, as preferred, convert the cross-sectionally round blank to one which is oblated or of elliptical cross sectional form,—the composite wire having a considerably increased width at its middle portion which is to make the nose rest or bow 10. I now, finally, bend the blank to the usual nose-piece form either by hand or by the employment of tools of simple character.

By the exercise of the hereinabove described method and the employment of the ferrules $o$ $o$ of, for instance, one grain each (goldsmiths' weight) an eye glass frame may be produced which may be safely guaranteed to withstand wear for 10 years, or even longer, and with no apprehension that there will be out croppings from corrosion of the gold inclosed base metal.

While I have mentioned herein the employment of gold as the covering and reinforcing material, yet it will be understood that "gold" is merely used in an illustrative sense, and that the term "gold" in the appended claims is likewise used in an illustrative and not in a restrictive sense.

I claim:—

1. The method of making a nose-piece of U form having return bent extremities from base metal and with a gold covering which is thicker at the return bends,—which consists in forming a gold-covered base-metal wire with a thick intermediate portion, and extremities of reduced diameter, applying and uniting gold reinforce members on suitable portions of the reduced extremities of the wire, swaging the reinforce members and thereby tapering them towards their outer ends, and bending the wire at the reinforced regions to form the nose piece.

2. The method of making a nose-piece of U form having return bent extremities from base-metal and with a gold covering which is thicker at the return bends,—which consists in forming a gold-covered base-metal wire with a thick intermediate portion, and extremities of reduced diameter, applying and uniting gold sleeves or ferrules on the portions of the reduced extremities of the wire against the shoulders thereof formed at the ends of the thick intermediate portion, swaging the ferrules and thereby elongating them over the reduced extremities of the wire, and tapering them towards their outer ends, and bending the wire at the reinforced regions to nose piece form.

3. The method of making a nose-piece of U form having return bent extremities from base-metal and with a gold covering which is thicker at the return bends,—which consists in forming a gold-covered base-metal wire with a thick intermediate portion, and extremities of reduced diameter, and with the shoulders, at the junctions of the portions of the different diameters, beveled, constructing, applying, and uniting, gold reinforce members each having a flaring mouth at one end on the portions of the reduced extremities of the wire against the beveled shoulders thereof formed at the ends of the thick intermediate portion, swaging the reinforce members and thereby tapering them towards their outer ends, and bending the wire at the reinforced regions to the nose-piece form.

4. The method of making a nose piece of the character described, which consists in providing a gold-covered base-metal wire, swaging gold reinforce members on separated portions thereof between the middle and ends, and bending the wire at the reinforced regions to nose-piece form.

Signed by me at Springfield, Mass., in presence of two subscribing witnesses.

WALTER A. COATES.

Witnesses:
WM. S. BELLOWS,
G. R. DRISCOLL.